United States Patent [19]

Cuevas

[11] Patent Number: 4,955,984
[45] Date of Patent: Sep. 11, 1990

[54] SAFETY DEBRIS CATCHER

[76] Inventor: Levearn F. Cuevas, P.O. Box 479, Long Beach, Miss. 39560

[21] Appl. No.: 376,763

[22] Filed: Jul. 7, 1989

Related U.S. Application Data

[63] Continuation-in-part of Ser. No. 21,087, Mar. 3, 1987, abandoned.

[51] Int. Cl.[5] .............................................. B23B 45/00
[52] U.S. Cl. ..................................... 408/67; 408/72 R
[58] Field of Search .................... 408/67, 72 R, 241 G; 175/211

[56] References Cited

U.S. PATENT DOCUMENTS

| | | | |
|---|---|---|---|
| 1,237,064 | 8/1917 | Kunitz | 408/67 |
| 2,643,088 | 6/1953 | Hornack | 408/67 |
| 2,792,199 | 5/1957 | Becker et al. | 175/211 |
| 3,339,435 | 9/1967 | Heitz | 408/67 |
| 3,583,821 | 6/1971 | Phaub et al. | 175/211 |
| 3,936,213 | 2/1976 | Koppel | 408/67 |

FOREIGN PATENT DOCUMENTS

| | | | |
|---|---|---|---|
| 2055010 | 5/1972 | Fed. Rep. of Germany | 408/67 |
| 3140776 | 4/1983 | Fed. Rep. of Germany | 408/67 |
| 1593143 | 7/1981 | United Kingdom | 408/241 G |

*Primary Examiner*—Daniel Howell
*Attorney, Agent, or Firm*—James F. Weiler

[57] ABSTRACT

Disclosed are safety debris collectors for collecting dust and debris, such as concrete particles and dust, rock chips, steel particles, radioactive particles, insulation and other particles and dust when drilling, chipping, and using stud guns, drills, piston drive devices and other operating tools used in the construction industry which create working dust or debris and the like. The safety debris catcher does not rotate or move with the operating portion of the tool, it is easily and readily connected to and detached from an operating tool or device, it can be used in confined spaces, such as spaces between beams, braces, and ceilings at different elevations, and it can be used at any angle and effectively collect debris, dust and other particles.

4 Claims, 3 Drawing Sheets

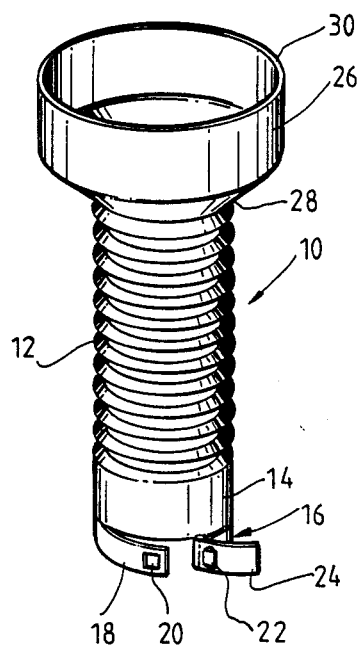
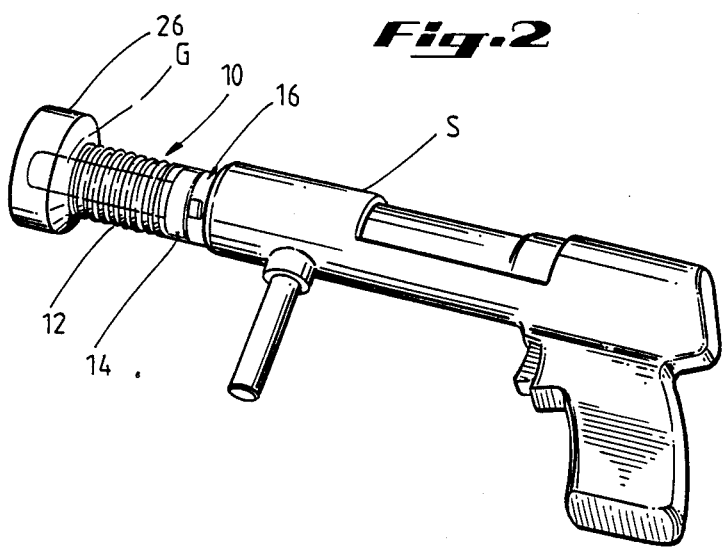
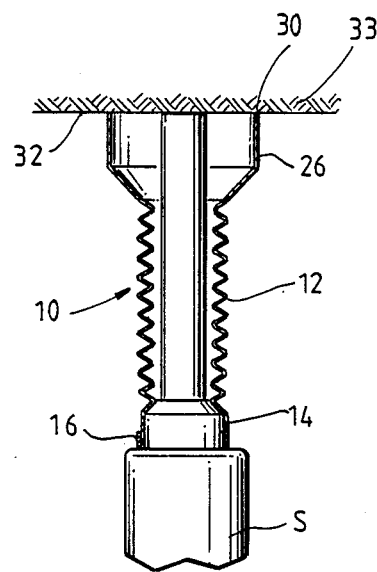
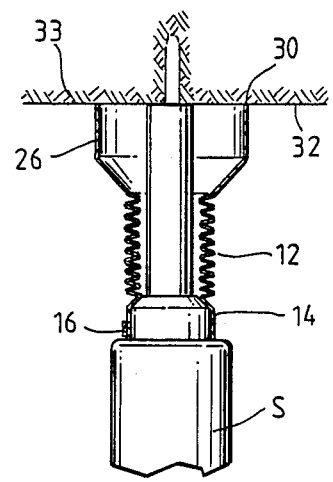

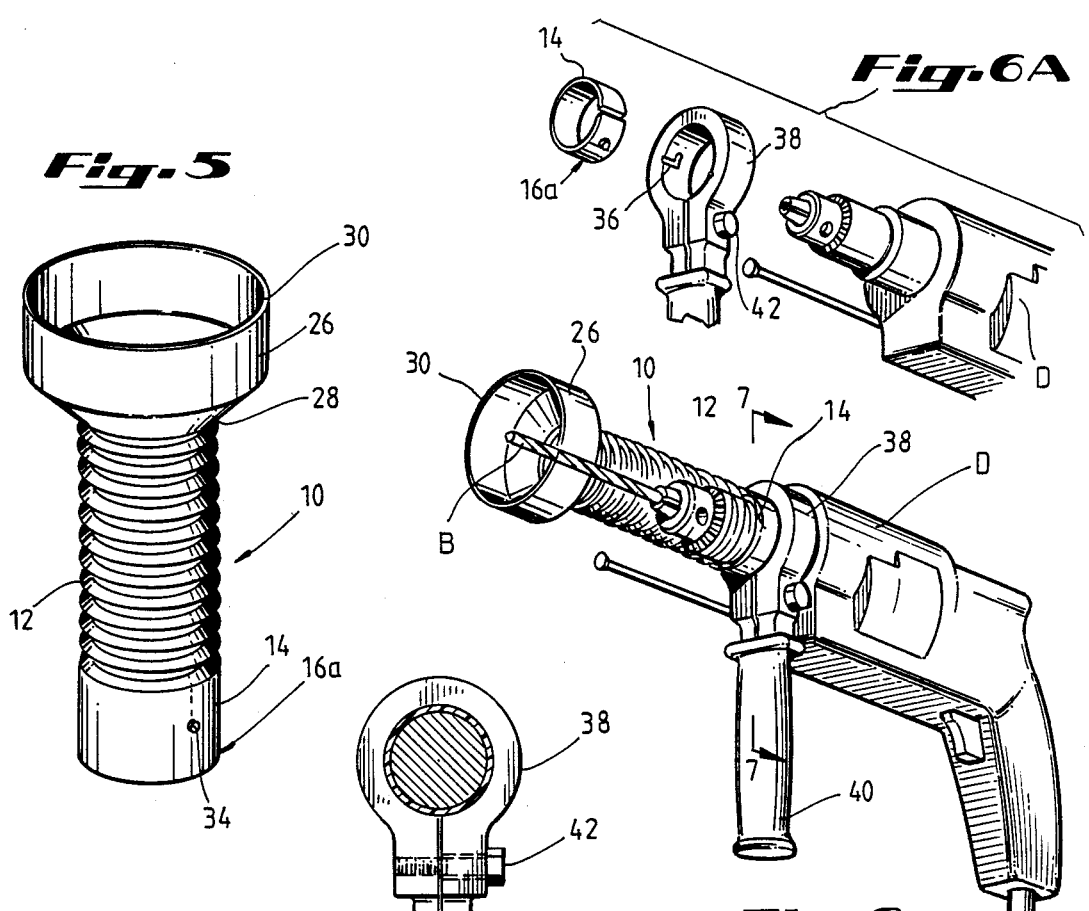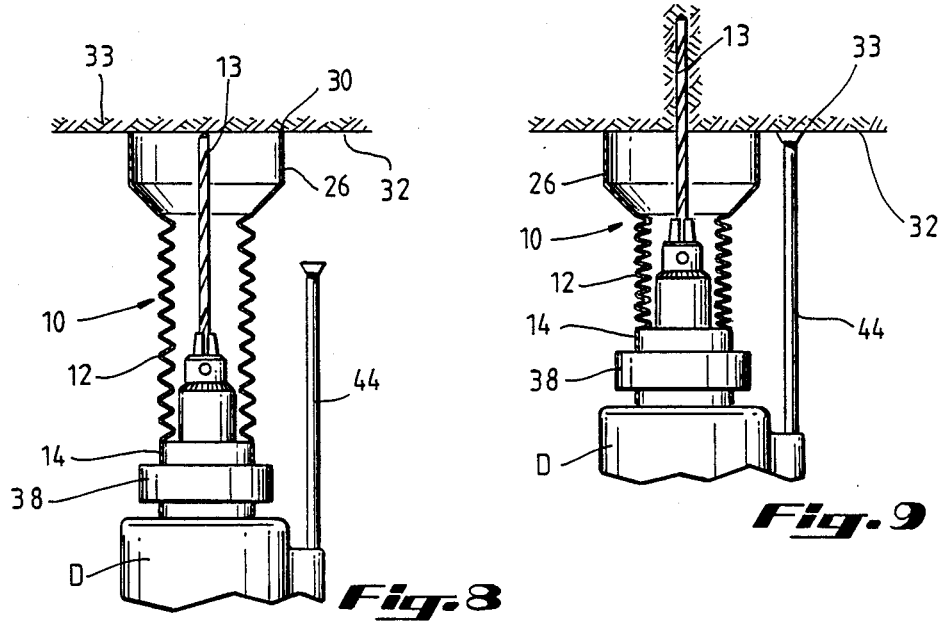

4,955,984

SAFETY DEBRIS CATCHER

CROSS-REFERENCE TO RELATED APPLICATION

The present application is a continuation-in-part to application Ser. No. 021,087, filed Mar. 3, 1987, now abandoned.

FIELD OF THE INVENTION

The present invention is directed to safety debris catchers for use with construction apparatus or tools, such as drills, hammer drills, piston drive devices, and stud guns, used in the construction industry to collect debris, such as concrete dust, rock chips, steel particles, radioactive particles, insulation and other particles and dust when drilling, chipping, and using such tools or apparatus.

BACKGROUND OF THE INVENTION

In the construction of buildings and houses, a considerable amount of drilling, chipping, use of stud guns and other tools are necessarily utilized which results in forming debris and dust consisting of concrete dust, rock chips, shavings, steel particles, and the like such as when a drill, chisel or stud engages a surface of a ceiling, wall, floor, or construction member, such as steel mesh, reinforcement rods or wires, and in nuclear power plants, particles of radioactive material.

A number of debris catchers have been proposed in an effort to prevent the dust, chips, shavings, particles, and the like from falling in the face, eyes, etc., of the operator, to lessen debris, dust and the like in offices or buildings which are occupied or have equipment in them, to keep the work area cleaner and safer and to extend the life expectancy of the operating tool by preventing debris from contacting it.

PRIOR ART STATEMENT

As a result of a preliminary patentability search, the applicant is aware of the following U.S. patents:

U.S. Pat. No. 3,339,435 (Heitz) discloses a device for drilling machines for collecting chipped material which is quite complicated and consists of many parts, and in which the collecting portion of the device is quite bulky making it unsuitable for use when working in confined spaces, such as between pipes, beams, walls, and the like.

U.S. Pat. No. 2,792,199 (Becker, et. al.) discloses a dust collector. Here again, the collector is quite bulky, and in this case, is connected to and rotates with a rotating drill thereby creating debris, dust and the like not collected by the collector when placed against the surface of a ceiling, wall, floor, structural component, and the like.

U.S. Pat. No. 1,237,064 (Kunitz) discloses a drill which includes a basin which is stated in the patent to be "adapted to catch and retain the chips from the socket or the material cut therefrom." The basin is quite bulky and is spaced from the operating portion of the tool, that is the blades 4, and does not engage the ceiling, wall, or floor when in use thereby catching very little debris, if any.

U.S. Pat. No. 2,643,088 (Hornack) is directed to a portable tool which has a cup stated to be for the purpose to receiving the drillings and to prevent such drillings from falling into the tool bearings or onto the floor or person of the operator. The cup, however, extends outwardly a considerable distance from the drill and stops short of the end of the drill so that it does not seat against the surface of the wall, ceiling, or floor during a substantial portion of the drilling whereby debris does fall onto the floor and the operator.

U.S. Pat. No. 3,936,213 (Kappel) discloses a device for use with drills or the like for the collection of working debris. In my experience of some 25 years of working with mechanical contractors as a pipe fitter, the only debris catcher I have seen in use is the one that is illustrated in FIG. 5 of this patent. In all of the figures and in the one which has been used, the debris catcher is mounted on a drill which sits on a chuck, and since the debris catcher is mounted this way, it rotates with the drill in operation. The catcher sets on the chuck of the drill and turns thus creating dust and debris not caught by the catcher. In use, the Kappel debris catchers have a small percentage of debris catching success.

All of the catchers in the Kappel patent turn when the drill is in operation which creates dust and particles when it makes contact with a surface, for example concrete or insulated surfaces. In some cases, drilling must be done on concrete surfaces that have been sprayed with insulation. For example, where the ceiling has been sprayed with insulation prior to all pipe, pipe supports, and pipe hangers being installed. This kind of surface is found during the construction phase of hospitals and offices and this insulation is hazardous to the lungs and eyes by causing infections and corneal abrasions.

In addition, the debris catchers in FIGS. 2 and 3 cannot be used at all with a chisel inserted in the drill because of the closed-in feature of the catcher. A number of buildings have many beams, braces and ceilings at different elevations which causes problems with the installation of hangers and supports. Also a large percentage of the drilling is done at an angle as much as 45°.

None of the collectors disclosed in the foregoing patents or which have been in use provide a debris catcher which can be used in confined spaces, and which can be seated against surfaces at any angle and effectively catch the debris from drills, hammer drills, stud guns, and the like.

SUMMARY OF THE PRESENT INVENTION

The present invention is directed to a safety debris catcher in which the catcher is readily and quickly mounted to the operating tool by very simple, quick connect and release connector means so that the catcher is connected to but does not rotate or move with the operating portion of the tool, such as the drill, chisel, recoil barrel of a stud gun, and the like, which has a resilient, compressible bellows portion surrounding the operating part of the tool, and has a collector or catcher portion at its outer end which extends beyond the working component of the tool at a distance sufficient so that it will non-rotatably seat against a wall, ceiling, floor, or other surface, which effectively collects and/or confines debris when used at any angle, and which does not create additional debris while in us, such as catchers or collectors rotating against a working surface.

It is therefore an object of the present invention to provide a safety debris collector which can readily and easily be attached to an operating tool or device, such as a drill, hammer drill, stud gun, and the like that does not move with the operating part of the tool so that it can be non-rotatably and non-movably seated against a wall, ceiling, or floor, and which can be used in confined spaces, such as spaces between beams and braces, and with ceilings at different elevations, to collect working debris and dust and prevent them from falling on the operator, the area or premises where it is used and on any occupants, machinery or furniture in the premises.

It is a further object of the present invention to provide such a safety debris catcher which can be used at any angle and which effectively collects and confines debris when in use.

A further object of the present invention is the provision of such a safety debris collector which is relatively simple, inexpensive, effectively collects debris in use, and which is readily, easily, and quickly attached to or disconnected from an operating tool.

Other and further objects and features of the invention appear throughout the specification and claims and are inherent therein.

BRIEF DESCRIPTION OF THE DRAWINGS

FIG. 1 is an elevational, perspective view of a safety dust or debris catcher according to the present invention.

FIG. 2 illustrates the safety debris catcher of FIG. 1 attached to a stud gun.

FIG. 3 is a partial, elevational view of the stud gun and safety debris catcher of FIGS. 1 and 2 in use and prior to firing the stud gun with the collector of the safety debris catcher seated against a surface.

FIG. 4 is a view similar to FIG. 3, but illustrates the position of the stud gun and the safety debris catcher after firing of the stud.

FIG. 5 is a view similar to that of FIG. 1 but illustrates a modified form of the quick attachment and detachable means.

FIG. 6 illustrates the safety debris collector of FIG. 5 connected to a hammer drill apparatus.

FIG. 6A is an expanded, partial view of the drill apparatus of FIG. 6 illustrating the modified quick attachment and detachable means.

FIG. 7 is a view taken along the line 7—7 of FIG. 6.

FIG. 8 is a view similar to FIG. 3 but illustrates the safety debris catcher and drill of FIGS. 5-7 in initial position to drill into a surface.

FIG. 9 is a view similar to that of FIG. 4 but illustrates the position of the collector and drilling.

DESCRIPTION OF PREFERRED EMBODIMENTS

Figure 10:
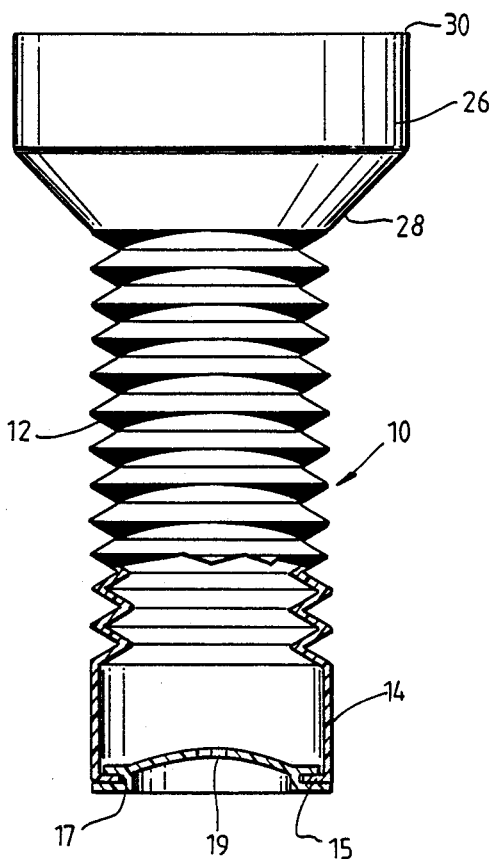
FIG. 10 is a view similar to FIGS. 1 and 5 but illustrates the means for non-rotatably or non-movably connecting the safety debris catcher to the operating component of an apparatus.

Referring to the drawings, and particularly to FIG. 1, the safety debris catcher is generally indicated by the reference number 10 which includes a resilient or compressible sleeve-like bellows portion 12 which is generally tubular in shape and extends for the major portion of the safety debris catcher 10. Means are provided to non-rotatably connect the safety debris catcher to an operating tool S, which is accomplished in this form of the invention by providing a sleeve 14 of generally tubular configuration sized to fit over a shoulder or other non-rotatable member of the operating tool S, here shown as the stud gun S, adjacent the recoil barrel B. Provided at the inner end of the debris catcher 10 is a quick attachment and detachment means or connector 16, here shown as a strap 18 which includes the opening 20 and projection 22 on the tab 24. Pulling the tab 24 over the end of the strap 18 and pressing the projection 22 into the opening 20 provides a quick connection, and pulling the tab 24 to pull the projection 22 out of the opening 20 quickly releases the connection 16.

At the outer end of the sleeve-like bellows portion 12 of the safety debris catcher 10 is a debris collector 26 which extends outwardly a relatively short distance from the bellows sleeve portion 12 and, preferably, is generally tubular in shape and has an outwardly tapered portion 28 connecting it to the bellows portion 12. The debris collector 26, like the bellows portion 12, is made of a resilient-type material. While the debris collector can take a variety of shapes, it is essential that it have a seating surface, such as 30, which extends outwardly a relatively short distance from the outer surface of the bellows sleeve portion so that it can be seated against a surface in a confined space. For example, preferably, the debris collector 26 should not extend outwardly a distance greater than twice the diameter of the bellow sleeve portion 12.

The various parts of the safety debris catcher 10 can be formed as a unit, such as by molding and the like, or can be made separately and releasably secured together by any suitable means, such as threading and the like. The safety debris catcher can be made out of any suitable resilient material which will permit the bellows portion 12 to compress axially when in use, and, preferably, would provide a seal when the seating surface 30 is seated against a surface. Suitable resilient materials include various plastics, clear and acid resistant, rubber and the like which are readily available on the market.

Referring now to FIG. 2, the safety debris catcher 10 is illustrated connected to a stud gun S. No detailed description is given or deemed necessary of the stud gun S as the safety debris catcher 10 can be used with any type of stud gun, many of which are available on the commercial market and in use in the construction industry.

Advantageously, the safety debris catcher 10 is secured to a shoulder, not shown, on the stud gun S by the quick make up connector 16.

As previously indicated, and as illustrated in FIG. 2, the seating surface 30 of the safety debris catcher 10 extends outwardly beyond the working part, here the recoil barrel B, of the stud gun S a distance so that, and as illustrated in FIG. 3 to which reference is now made, the seating surface 30 of the debris collector 26 seats against the surface 32 of a construction member 33 which, in this case, is to have a stud fired into it. In addition, the seating surface 30 extends beyond the end of the working part B a distance sufficient so that the safety debris catcher can be used at any angle, that is up to 45° in any direction.

It is noted in the form of the invention in FIG. 3 that the sleeve-like bellows portion 12 is closely adjacent to and surrounds the working component of the stud gun S, here shown as the recoil barrel G, that the safety debris collector 26 extends outwardly a relatively short distance of the sleeve-like bellows portion 12 and that the sleeve-like bellows portion 12 extends axially a majority of the distance of the safety debris catcher 10. This permits the safety debris catcher 10 to be used in confined spaces and against surfaces disposed at any angle and effectively collects working debris and dust.

Referring now to FIG. 4, the stud gun S and safety debris catcher 10 are shown in position against the surface 32 after firing of a stud from the stud gun S. As there shown, by pressing the gun S against the surface 32 then firing it, the seating surface 30 of the debris collector 26 stays in engagement with the surface 32, the recoil barrel G has recoiled, and the bellows 12 has been compressed in an axial direction. The gun S with the safety debris catcher 10 on it may now be removed, the debris collected in the debris collector 26 may be emptied into a suitable disposal container, not shown, or otherwise disposed of.

Referring to FIG. 5, a modification of the safety debris catcher 10 is illustrated in which all of the parts are the same as those of FIGS. 1-4 with the exception that a modified form 16a of the quick connect and disconnect means 16 for non-rotatably mounting the safety debris catcher 10 to an operating tool is illustrated. In this form of connector, a pin 34 and a J-slot 36 are utilized. As best seen in FIGS. 5 and 6A, the pin 34 is shown on the sleeve 14 of the debris catcher 10 and the J-slot 36 is formed in the ring 38 of the handle 40 of the drilling tool D; although, these may be reversed, if desired.

In attaching the safety debris catcher 10 to the drill D, the nut 42 is rotated to permit the ring 38 to expand so that it can be removed from the drill D, the pin 34 of the quick make up and disconnect connector or means 16a is inserted into the J-slot 36 and rotated into the J-portion thereof, the ring 38 with the safety debris catcher 10 is then placed back on the drill D, and the nut 42 tightened. The safety debris collector 10 is thus secured in place on the drill D as best seen in FIGS. 6 and 7.

As best shown in FIG. 6, the safety debris catcher 10 extends out beyond the operating or moving portion of the drill D, in this case the bit B, a distance sufficient to seat the surface 30 or the collector 26 against the surface 32 of a construction member 33 before the drill B engages that surface at any angle of the safety debris catcher to the surface 32.

No detailed description is given or deemed necessary of the electric drill D as the safety debris catcher 10 can be connected to any such drills, many types of which are available in the commercial market and are in use in the construction industry.

Referring now to FIG. 8, the drill D with the safety debris catcher 10 connected to it is shown in use with the seating surface 30 of the safety debris collector 26 against the surface 32, the bellows 12 being compressed sufficiently to permit the bit B of the drill 6 to engage the surface 32. As drilling progresses, the bit B penetrates the surface 30 until completion, as shown in FIG. 9 in which the stop member 44 of the drill D engages the surface 32, the bellows portion 12 being axially compressed as the bit B drills further through the surface 32 into the construction member 33. The drill D may then be withdrawn from the surface 32, and as it is so withdrawn, the resilient bellows 12 expands in an axial direction to a shape as illustrated in FIGS. 1 and 5 with any debris collected in the debris collector 26 and the bellows 12. Again, this debris may be emptied into a suitable disposal container, not shown, or otherwise disposed of.

Figure 11:
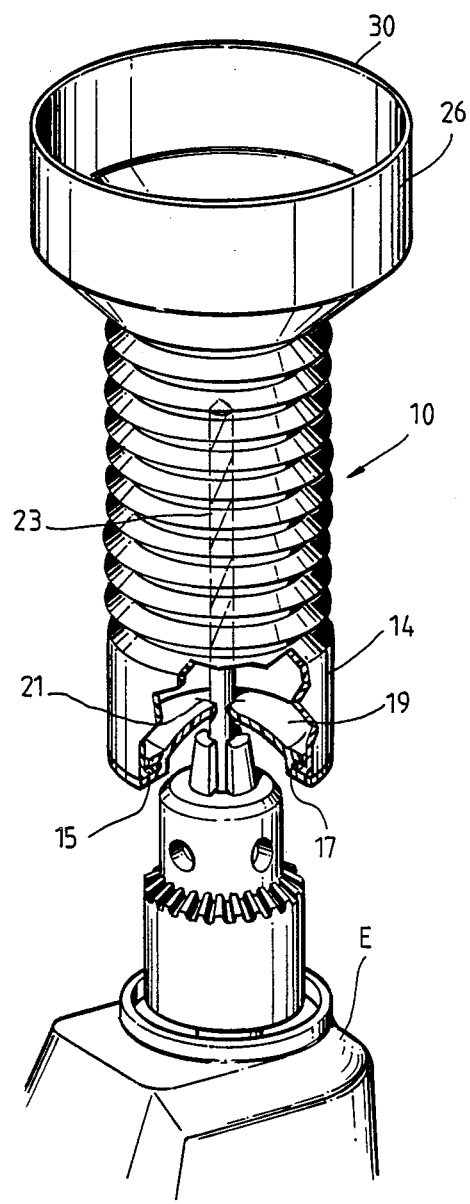
FIG. 11 illustrates the safety debris catcher of FIG. 10 to a power drill apparatus.

A further means for non-rotatably or non-movably connecting the safety debris catcher 10 to an operating tool is illustrated in FIGS. 10 and 11, to which reference is now made. In this embodiment of the invention, the sleeve 14 has the inwardly directed flange 15 whose inner perimeter is generally circular in configuration which is slidably positioned in a groove formed by the outwardly extending shoulders 17 of connector disk member 19, here shown as a generally flat member or disk 19, preferably with an inwardly bowed central portion to clear the jaws of the apparatus to which it is connected. If desired, the groove may be in the sleeve and the edge of the disk slidable in the groove. The disk 19 acts as a spinner member which rotates with the operating portion of the tool when attached to a rotating working part, but permits the safety debris catcher 10 to not rotate by virtue of the flange 15 sliding in the annular groove formed by the shoulders 17 of the disk 19. Also, when attached to a reciprocating working part of an apparatus, sliding improvement between the disk 19 and that part of the apparatus is possible. If desired, the bottom of the sleeve 14 may be a separate piece and form the grooves or shoulders 17 with the bottom of the sleeve 14 in which case the outer end of the disk 19 rotatably fits, in the shoulders or groove formed by the sleeve and the separate bottom piece. Thus, the disk 19 and sleeve 14 have interfitting portions rotatably securing the disk 19 to the sleeve 14.

As best seen in FIG. 11, the spinner disk 19 has an opening preferably formed by a series of splits or cuts 21 through its central portion so that the bit 23 or other working component of the apparatus can easily penetrate the disk 19.

Thus, in operation, when the seating or sealing surface 30 of the debris collector 26 is seated against a surface in operation, the safety debris catcher 10 does not rotate, although it is connected to a rotating drill bit 23, the connector disk 19 rotating with the drill bit 23, although there may be some slippage between the disk 19 and the bit 23.

In this embodiment of the invention, the safety debris catcher 10 may readily and easily be connected and disconnected to and from the operating tool simply by inserting or withdrawing the drill bit 23 or other working component through the opening formed by the slit portion 21 of the spinner disk 19.

It is understood, of course, that the means for non-rotatably connecting the safety debris collector 10 to various tools as shown in and described in connection with the drawings can be used with hammer drills, stud guns, drills and other apparatus creating working debris or dust, as desired, and the most practical for connection to a particular apparatus or use. For example, the connector illustrated in FIG. 10 and 11 is particularly well suited for use with electric drills used in the home and other operating tools so that it does not move with the moving or working portion of the particular tool. Thus, the safety debris 10 can be connected to and used with all types of power operating tools in which it is desired to catch debris and dust, thereby protecting the operator from working dust or debris and preventing them from falling onto the premises, the occupants and the equipment or furniture where the operating tool is being used.

While for the purposes of disclosure, the safety debris collector 10 has been illustrated on and in use with a stud gun, a hammer drill, and an electric drill, it may be used with any and all construction tools in which debris or dust is created or forms while the tool is in use.

Accordingly, the present invention is well suited and adapted to attain the objects and ends and has the features and advantages mentioned as well as others inherent therein.

While presently preferred embodiments have been given for the purpose of disclosure, changes and modifications thereto may be made therein which are within the spirit of the invention as defined by the scope of the appended claims.

What is claimed is:

1. A safety debris catcher for a drill, hammer drill, piston drive, and stud gun apparatus and the like having a working component, comprising
    a resilient, tubular, sleeve-like bellows having a sleeve at its inner end and a debris collector at its outer end,
    the bellows being compressible axially and fitting around the working component of the apparatus,
    the debris collector extending outwardly from the outer end of the bellows and having an outer seating surface adapted to seat against a surface of a wall, ceiling, floor, or construction member,
    the debris collector extending beyond the working component's outer end a distance so that it can be seated against the surface at a 45° angle to the surface, and
    a spinner disk adapted to be connected to the working component,
    the sleeve and the disk having interfitting portions rotatably connecting the sleeve and the disk.

2. The safety debris catcher of claim 1 where,
    the interfitting portions comprise a groove in the spinner disk's outer periphery, and
    the sleeve having an inwardly extending flange rotatably disposed in the groove.

3. A safety debris catcher for a drill, hammer drill, piston drive, and stud gun apparatus and the like having a working component, comprising
    a resilient, tubular, sleeve-like bellows having a sleeve at its inner end and a debris collector at its outer end,
    the bellows being compressible axially, having a substantially constant diameter and fitting closely around the working component of the apparatus,
    the debris collector extending outwardly from the outer end of the bellows and having an outer seating surface adapted to seat against a surface of a wall, ceiling, floor, or construction member,
    the bellows extending a majority of the axial distance of the debris collector,
    the debris collector extending beyond the working component's outer end a distance so that it can flex enough for its seal to be seated against the surface at a 45° angle to the surface, and
    a spinner disk adapted to be connected to the working component of the apparatus,
    the sleeve and the disk having interfitting portions rotatably connecting the sleeve and the disk.

4. A safety debris catcher for a drill, hammer drill, and stud gun apparatus and the like having a working component comprising,
    a resilient, tubular, sleeve-like bellows having a sleeve at its inner end and a debris collector at its outer end,
    the bellows being compressible axially, having a substantially constant diameter and fitting closely around the working component of the apparatus,
    the debris collector extending outwardly from the outer end of the bellows a distance not greater than twice the diameter of the bellows and having an outer seating surface adapted to seat against a surface of a wall, ceiling, floor, or construction member,
    the debris collector extending beyond the working component's outer end a distance so that it can flex enough so that its seating surface can be seated against the surface at a 45° angle to the surface, and
    a spinner disk adapted to be connected to the working component of the apparatus,
    the sleeve and the disk having interfitting portions rotatably connecting the sleeve and the disk,
    the bellows extending linearly from the spinner disk to the debris catcher.

* * * * *